Patented June 17, 1947

UNITED STATES PATENT OFFICE 2,422,246

CARBOXYLIC ACIDS VICINALLY SUBSTITUTED WITH TWO MERCAPTO GROUPS

Wilbur Arthur Lazier, Wilmington, Albert A. Pavlic, Claymont, and William Jennings Peppel, Wilmington, Del., assignors to E. I. du Pont de Nemours & Company, Wilmington, Del., a corporation of Delaware No Drawing. Application February 16, 1944, Serial No. 522,620

3 Claims. (Cl. 260—526)

This invention relates to carboxylic acids containing mercapto groups. More particularly, it relates to vicinal dimercaptocarboxylic acids and their esters.

Vicinal dimercaptocarboxylic acids, i. e., carboxylic acids containing two thiol groups on adjacent carbon atoms, constitute a hitherto unknown class of compounds. The acids and their esters are useful as rubber chemicals, petroleum chemicals, dyestuff intermediates, etc. Since they have at least three functional groups, they are well adapted for use in chemical syntheses when it is desirable to build up compounds through condensation reactions.

An object of this invention is to make available a new class of compounds, the vicinal dimercaptocarboxylic acids. A further object comprises the esters and salts of these acids. Another object is to provide processes for the preparation of these products. Other objects will appear hereinafter.

These objects are accomplished by the invention of vicinal dimercapto carboxylic acids, i. e., acids having a mercapto group on each of two carbons joined to each other, and their esters and salts.

The invention is illustrated by the following examples, in which parts are by weight.

Example I

This example illustrates the preparation of 2,3-dimercaptopropionic acid from methyl 3-acetylthio-2-chloro-propionate,

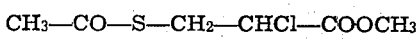

$CH_3—CO—S—CH_2—CHCl—COOCH_3$

A mixture of 590 parts of methyl 3-acetylthio-2-chloropropionate (prepared as described below) and 500 parts of pyridine is cooled to 5° C. To the vigorously stirred mixture is added, in the course of four hours, 275 parts of thioacetic acid, the temperature being maintained below 15° C. by external cooling. After standing at room temperature for about 16 hours, the resulting slurry is cooled to −15° C. and rapidly stirred while 260 parts of concentrated hydrochloric acid is added dropwise to neutralize the pyridine. During this addition it is convenient to add also about 100 parts of water to facilitate stirring. The oil which separates is extracted with three successive portions of 200 parts of ether, the ether extract is washed once with 10% hydrochloric acid, twice with water, then dried over anhydrous sodium sulfate. Distillation of the ether leaves a residue of 720 parts of crude methyl 2,3-bis-(acetylthio) propionate. This material may be purified by distillation. It boils at 112–114° C. at 0.5 mm. pressure. It is found to contain 40.97% carbon, 5.25% hydrogen and 27.88% sulfur as compared with the calculated values of 40.65%, 5.12% and 27.11%, respectively.

The crude product is hydrolyzed without further purification by dissolving it in 2800 parts of methanol containing 1% of anhydrous hydrogen chloride and allowing the solution to stand 48 hours at room temperature. Approximately four-fifths of the solvent is then removed by distillation and an additional 800 parts of a 1% solution of hydrogen chloride in methanol is added to insure complete hydrolysis of the acetylthio groups. The remaining methanol and methyl acetate are removed by distillation at reduced pressure, leaving a residue of 520 parts of crude methyl 2,3-dimercaptopropionate. By fractional distillation there is isolated 265 parts of pure methyl 2,3-dimercaptopropionate (yield: 58% of the theory), which boils at 40° C. at 0.2 mm. or at 54° C. at 0.5 mm. Its refractive index $n_D^{25}$ is 1.5251, and its specific gravity $d_4^{25}$ is 1.2294.

Analyses: Calculated for $C_4H_8O_2S_2$: C, 31.6%; H, 5.4%; S, 42.1%; thiol sulfur, 42.1%. Found: C, 32.4%; H, 5.4%; S, 42.2%; thiol sulfur 42.0%.

The free 2,3-dimercaptopropionic acid can be obtained from its methyl ester as follows: A mixture of 59 parts of the ester with 650 parts of 1% aqueous hydrochloric acid is refluxed for eight hours (it is homogeneous after four hours). The hydrolysis mixture is then extracted with four 70-part portions of ether. After drying the ether extract over anhydrous calcium sulfate and distilling off the ether, there is obtained a solid residue of 2,3-dimercaptopropionic acid, which is recrystallized from chloroform. The yield is 45 parts, or 83% of the theoretical. 2,3-dimercaptopropionic acid is a white crystalline solid melting at 74–74.5° C. It is soluble in water to the extent of about 8%.

Analyses: Calculated for $C_3H_6O_2S_2$: C, 26.1%; H, 4.4%; S, 46.4%; thiol sulfur, 46.4%; neutralization equivalent, 138. Found: C, 26.0%; H, 4.7%; S, 45.7%; thiol sulfur, 46.1%; neutralization equivalent, 139.

The methyl 3-acetylthio-2-chloropropionate used above may be prepared by allowing a mixture of 90 parts of methyl alpha-chloroacrylate and 57 parts of thioacetic acid to react at room temperature for 24 hours. Distillation under reduced pressure yields 103 parts (yield: 84% of the theoretical) of pure methyl 3-acetylthio-2-chloropionate, boiling at 72° C. at 1 mm. pressure and having a refractive index $n_D^{25}=1.4898$.

Example II

This example illustrates the preparation of the glycerol ester of 2,3-dimercaptopropionic acid.

A mixture of 6.9 parts of 2,3-dimercaptopropionic acid and 4.6 parts of gycerol is heated with stirring at 120–125° C. The course of the reaction is followed by periodically determining the percentage of 2,3-dimercaptopropionic acid present in the mixture, which is orginally 60%.

After ten minutes, it is 53%; after two hours, 30.5%; after four hours, 15.9%; and after 7 hours, about 10%. Heating is discontinued then, since the reaction becomes very slow. Iodine titration shows no appreciable loss in thiol sulfur. The product, which is essentially the monoglyceryl ester of 2,3-dimercaptopropionic acid, is a clear, colorless oil partially soluble in water, and soluble in the common organic solvents.

*Example III*

This example illustrates the preparation of 10,11-dimercaptoundecanoic acid. The process consists in reacting 10,11-dibromoundecanoic acid with sodium polysulfide and hydrogenating the polymeric sulfide thus obtained, according to the following equations:

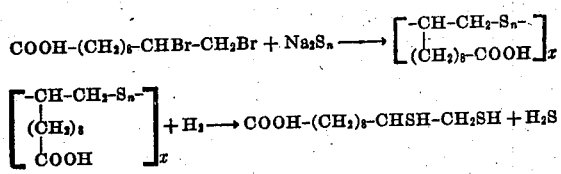

Ninety parts of sodium sulfide ($Na_2S$, $9H_2O$) and 23 parts of sulfur are stirred with 150 parts of water at 50° C. until a homogeneous solution is obtained. There is then added dropwise with stirring to the warm sodium polysulfide solution a solution prepared by neutralizing 120 parts of 10,11-dibromoundecanoic acid with 10% aqueous sodium hydroxide. The addition takes three hours, and the polymer which precipitates is digested for seven hours at 75° C. The solution is cooled and the polymer is filtered and partially dried under reduced pressure. The polymeric sulfide, still slightly moist, is placed in an oscillating autoclave with 100 parts of dioxane as solvent and ten parts of cobalt trisulfide catalyst and hydrogenated at 125° C. and 2000 pounds pressure until there is no further absorption of hydrogen. The catalyst is then filtered off and the solution made acid with 10% aqueous hydrochloric acid. Upon addition of 500 parts of water, a brown oil precipitates which is removed, dried and distilled through a short still head. The crude product, which boils at 135–188° C. at 0.2 mm. pressure, gives on redistillation the pure 10,11-dimercaptoundecanoic acid as a liquid boiling at 166–167° C. at 0.2 mm. pressure. It contains 25.2% of thiol sulfur and has a neutralization equivalent of 249, as compared with the calculated values of 25.6 and 250, respectively.

This invention contemplates any vicinal dimercaptocarboxylic acid. In addition to those described in the examples, there may be mentioned 2,3-dimercaptobutyric acid, 4,5-dimercaptovaleric acid, 5,6-dimercaptocaproic acid, 9,10-dimercaptostearic acid, 9,10-dimercapto-12-hydroxystearic acid, 2,3-dimercaptobenzoic acid, 2,3-dimercaptonaphthoic acid, etc. The acids may contain other substituents such as amino, nitro, alkoxy, aryloxy groups and may contain in the carbon chain hetero atoms such as oxygen, sulfur, tertiary nitrogen, or groups such as the sulfone or carbonyl groups, etc.

Several processes are available for preparing the vicinal dimercaptocarboxylic acids. Under favorable conditions, the thiol groups may be introduced by means of the known methods for preparing thiols. These include the reaction of alkali hydrosulfides with a vincinal dihalogenocarboxylic acid, preferably in the form of a salt or ester. Instead of an alkali hydrosulfide, thiourea may be used, followed by hydrolysis of the S-alkylisothiouronium salt. When it is desirable to avoid the use of strong alkali, the process described in Example I, i. e., the reaction of a halide with thioacetic acid in the presence of an amine, is used with advantage. This process is more particularly described and claimed in application Serial No. 509,896, filed by Albert A. Pavlic on November 11, 1943, now U. S. Patent 2,408,094. The process described in Example III, i. e., the reaction of vicinal dihalogenocarboxylic acids with an alkali polysulfide followed by hydrogenation of the polymeric sulfide, is another convenient method.

The invention contemplates further the esters of vicinal dimercaptocarboxylic acids. The alcohol radical of said esters may be aliphatic, cycloaliphatic, araliphatic, aromatic, or heterocyclic, saturated or unsaturated, mono or polyhydroxylated. Examples of alcohols suitable for esterification are methyl, ethyl, butyl, crotyl, dodecyl, octadecyl, cyclohexyl, benzyl, cinnamyl, furfuryl, aminoethyl alcohols, phenol, cresol, ethylene glycol, glycerol, etc. The preferred esters are those in which the alcohol radical is that of an alkanol of up to seven carbon atoms. Another preferred class comprises the mono- and polyesters of a vicinal dimercaptocarboxylic acid, particularly 2,3-dimercaptopropionic acid with a polyhydric alcohol such as ethylene glycol or glycerol. These esters are of interest as plasticizers, petroleum chemicals, etc. The esters may be prepared by any of the known procedures such as direct esterification, ester interchange, etc., or by hydrogenation of polysulfides containing ester groups.

The invention contemplates also the salts of vicinal dimercaptocarboxylic acids, such as the ammonium, sodium, potassium, magnesium, calcium, copper, aluminum, iron salts, particularly those of 2,3-dimercaptopropionic acid which are, in general, soluble in water. These salts may be prepared by any of the known methods, for example by decomposing a carbonate of the metal in aqueous solution with 2,3-dimercaptopropionic acid and evaporating the solution.

The above description and examples are intended to be illustrative only. Any modification thereof or variation therefrom which conforms to the spirit of the invention is intended to be included within the scope of the claims.

What is claimed is:

1. An aliphatic monocarboxylic acid of the formula $$(HS)_2RCO_2H$$

wherein R is a trivalent, saturated, straight chain, aliphatic hydrocarbon radical of 2 to 10 carbon atoms, the carboxyl group is attached to a terminal carbon of the chain, one —SH group is attached to the other terminal carbon of the chain and the second —SH group is attached to the carbon contiguous to the terminal carbon bearing the SH group.

2. 2,3-dimercaptopropionic acid.
3. 10,11-dimercaptoundecanoic acid.

WILBUR ARTHUR LAZIER.
ALBERT A. PAVLIC.
WILLIAM JENNINGS PEPPEL.

REFERENCES CITED

The following references are of record in the file of this patent:

Koelsch, J. Am. Chem. Soc., vol. 52, pages 1105–1108 (1930).